F. ROGALSKI.
AUTOMATIC AIR PUMP.
APPLICATION FILED OCT. 16, 1916.
1,233,704.
Patented July 17, 1917.
2 SHEETS—SHEET 1.
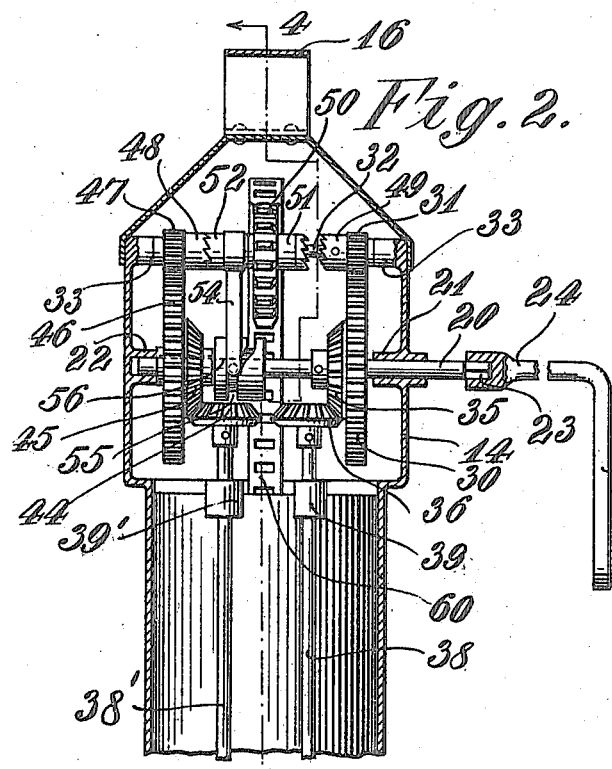
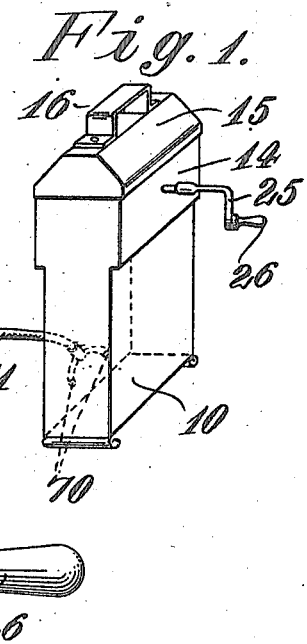
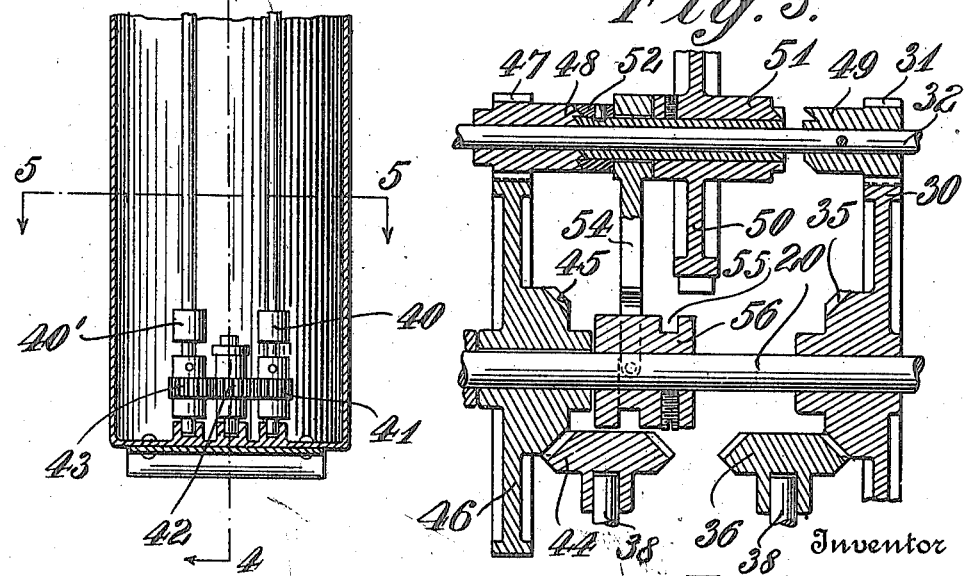
Inventor
Frank Rogalski
By his Attorney
Oscar Geier F. ROGALSKI.
AUTOMATIC AIR PUMP.
APPLICATION FILED OCT. 16, 1916.
1,233,704.
Patented July 17, 1917.
2 SHEETS—SHEET 2.
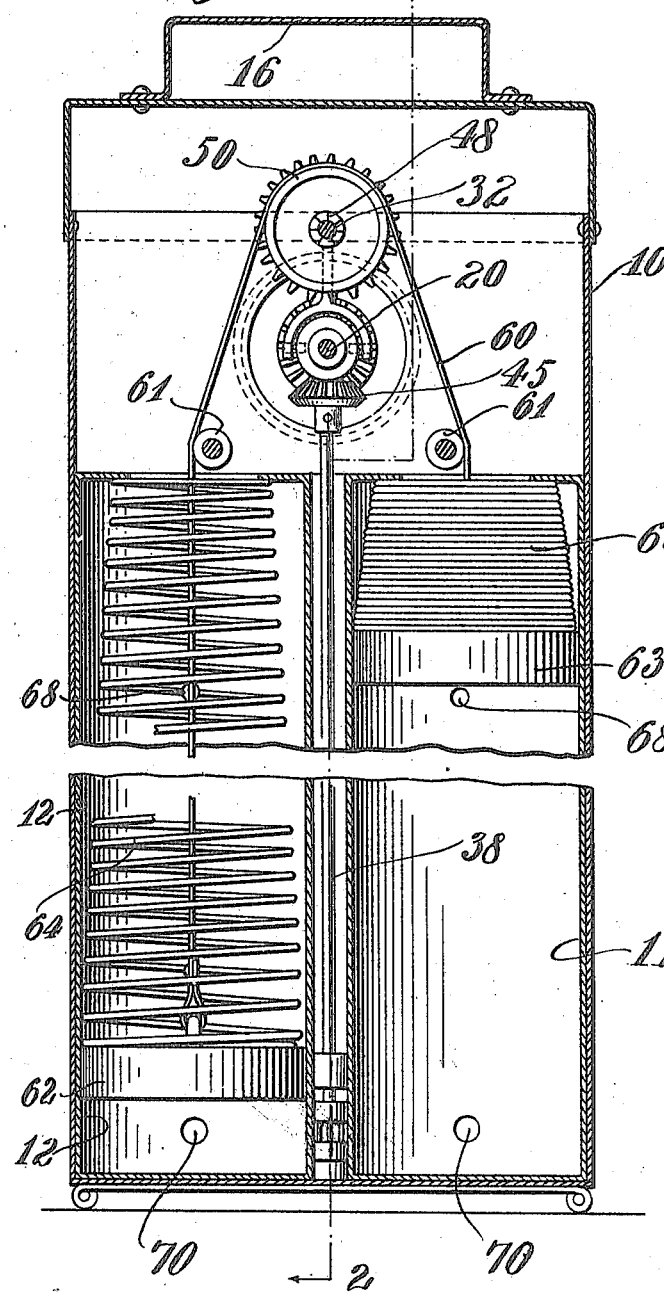
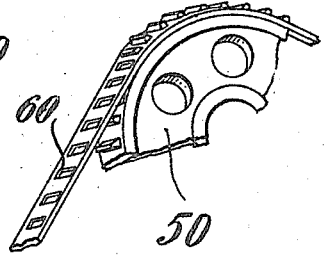
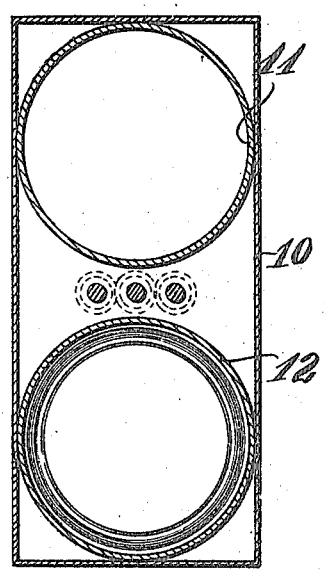

UNITED STATES PATENT OFFICE.

FRANK ROGALSKI, OF DETROIT, MICHIGAN.

AUTOMATIC AIR-PUMP.

1,233,704.  Specification of Letters Patent.  Patented July 17, 1917.

Application filed October 16, 1916. Serial No. 125,794.

*To all whom it may concern:*

Be it known that I, FRANK ROGALSKI, a subject of the Czar of Russia, and a resident of Detroit, in the county of Wayne and State of Michigan, have invented certain new and useful Improvements in Automatic Air-Pumps, of which the following is a specification.

This invention relates to improvements in air pumps, such as are readily portable and capable of being operated manually for the compression of air in such quantities as may be desired.

The principal object of the invention is to provide an apparatus which may be readily carried from place to place and operated merely by the turning of a crank whereby air may be compressed in such quantities as are desired, as for instance, the inflating of automobile tires and like purposes.

Another object is to provide such apparatus comprising few and simple parts, not readily liable to disarrangement.

These and other objects are obtained by the novel construction and combination of parts, hereafter described and shown in the accompanying drawings, forming a part of the specification, and in which—

Figure 1, is a perspective view showing the apparatus in position for use,

Fig. 2, is an enlarged vertical sectional view taken on line 2—2 of Fig. 4,

Fig. 3 is a further enlarged sectional view, showing the upper portion of the operative mechanism, Fig. 4 is a vertical sectional view taken on line 4—4 of Fig. 2, looking in a different plane, Fig. 5 is a transverse sectional view taken on line 5—5 of Fig. 2, and Fig. 6 is a fragmental perspective view showing the arrangement of band and sprocket.

The device is comprised of a substantially rectangular casing 10, containing vertical cylinders 11 and 12, arranged in pairs. The upper portion of the casing 14 is widened laterally and provided with an angular roofing 15 at the top of which is a handle 16, by means of which the apparatus may be readily carried. Passing transversely through the enlargement 14 is a shaft 20, revolubly mounted in bearings 21 and 22 formed with the casing, one end 23 of the shaft being squared to receive an engaging element 24, provided with a crank 25 and handle 26, the crank being removable at will. Rigidly attached to the shaft 20, within the casing 14 is a spur gear 30, meshing with a pinion 31 mounted on a shaft 32 carried by bearings 33, arranged in the upper part of the casing 14, the purpose of which will hereafter be described.

Also mounted on the shaft 20, adjacent to the spur gear 30, is a bevel pinion 35, meshing with its mate 36, mounted on the extreme upper end of a vertically disposed shaft 38 revolubly engaged in bearings 39 and 40, respectively at its upper and lower ends, near the bottom of which is rigidly engaged a spur gear 41, meshing with an idler 42 conveying rotary motion to the corresponding spur gear 43, rigidly secured to the lower end of the shaft 38′, rotatably mounted in a second pair of bearings 39′ and 40′, the upper end of the shaft having affixed to it, a beveled gear 44 engaged with a corresponding beveled gear 45, combined with a spur gear 46, both gears being freely rotatable on the shaft 20.

Meshing with the spur gear 46 is a pinion 47 rotatable on the shaft 32, and having engaged with it, a clutch member 48, the teeth of which are similar to those upon the clutch member 49, formed with the pinion 31 at the opposite end of the shaft. Mounted midway on the shaft 32 is a sprocket wheel 50 having extended hubs 51 and 52, upon which are formed teeth adapted to engage with the clutches 49 and 48, respectively, the gear and its hubs or sleeves being slidable longitudinally on the shaft 32. Motion is communicated to these parts by reason of the arm 54, the lower end of which is bifurcated and provided with rollers adapted to engage in the slot 55 of the cam 56 rigidly affixed on the shaft 20.

Thus, as rotary motion is communicated to the shaft 20, by means of the crank, the clutches 48 and 49 are caused to rotate in opposite directions and the cam 56 moves the arm 54, together with the sprocket 50, causing it to oscillate back and forth upon the shaft 32, so as to engage and disengage with the clutches, thereby communicating reciprocal alternating changes in direction of rotation of the sprocket wheel, the crank being operated continuously in one direction.

Engaged with the sprocket wheel 50 is a band 60 running over guide wheels 61, the lower ends of the band being secured to plungers 62 and 63 respectively, same operating within the cylinders 11 and 12, the chain acting to draw the plungers upward, while the downward motion is effected by means of the conical, helical springs 64 and 65, arranged in their respective cylinders to press upon the plungers.

In Fig. 4, the plunger 63 is shown in a raised position, prior to the shifting of the sprocket wheel, the other plunger 62 being near the limit of its downward motion due to influence of the spring. Openings 68 are provided through the walls of the cylinder for the inlet of air, the discharge taking place through the openings 70, which are connected by the flexible hose 71 adapted to lead the compressed air to any desired point.

It will be seen that a convenient portable device is provided by means of which air may be compressed in any desired quantity and to any desired extent, depending upon the tension of the springs and the power applied in actuating the apparatus.

Having thus described my invention, what I claim as new and desire to obtain by Letters Patent, is:—

In a portable compressor, the combination with a pair of cylinders and plungers operable therein, of a casing arranged at the top of said cylinders, shafts mounted transversely in said casing, means for manually rotating one of said shafts, a sprocket wheel slidably and rotatively mounted on the other of said shafts, independent trains of gears between said shafts, means for shifting said sprocket wheel laterally on the shaft, automatically into alternate engagement with said gear trains, said shifting means being operated by the first of said shafts, means operatively engaged with said shafts for rotating said sprocket wheel, and a single flexible connection extending between said plungers, said connection being operatively engaged with said sprocket wheel.

Signed at Detroit, in the county of Wayne, and State of Michigan, this 29 day of September, 1916.

FRANK ROGALSKI.

Copies of this patent may be obtained for five cents each, by addressing the "Commissioner of Patents, Washington, D. C."